United States Patent
Dong et al.

(10) Patent No.: US 8,780,842 B2
(45) Date of Patent: Jul. 15, 2014

(54) METHOD AND SYSTEM FOR ALLOCATING HOME BASE STATION FREQUENCY POINT AND HOME BASE STATION MANAGER

(75) Inventors: Yuexin Dong, Shenzhen (CN); Yunxiang Xu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 136 days.

(21) Appl. No.: 13/517,467

(22) PCT Filed: Mar. 8, 2011

(86) PCT No.: PCT/CN2011/071615
§ 371 (c)(1),
(2), (4) Date: Jun. 20, 2012

(87) PCT Pub. No.: WO2011/143966
PCT Pub. Date: Nov. 24, 2011

(65) Prior Publication Data
US 2012/0257589 A1 Oct. 11, 2012

(30) Foreign Application Priority Data

May 15, 2010 (CN) .......................... 2010 1 0183961

(51) Int. Cl.
*H04W 4/00* (2009.01)
(52) U.S. Cl.
USPC .......................................................... 370/329
(58) Field of Classification Search
CPC .............. H04W 64/00; H04W 64/003; H04W 72/0453; H04W 88/02; H04W 88/12; H04W 16/10
USPC ......................................... 370/328, 329, 252
See application file for complete search history.

(56) References Cited

U.S. PATENT DOCUMENTS

| 2010/0291934 A1* | 11/2010 | Lopes .......................... 455/446 |
| 2012/0188975 A1* | 7/2012 | Li et al. .......................... 370/329 |
| 2013/0028113 A1* | 1/2013 | Zhu et al. ...................... 370/252 |

FOREIGN PATENT DOCUMENTS

| CN | 101364910 A | 2/2009 |
| CN | 101442750 A | 5/2009 |
| CN | 101668294 A | 3/2010 |
| CN | 101686486 A | 3/2010 |
| EP | 2 180 640 A1 * | 4/2010 |

OTHER PUBLICATIONS

International Search Report for PCT/CN2011/071615.

* cited by examiner

*Primary Examiner* — Gary Mui
(74) *Attorney, Agent, or Firm* — McClure, Qualey & Rodack, LLP

(57) ABSTRACT

A method and system for allocating a home base station frequency point and a home base station manager are disclosed by the present invention. The method includes: a home base station detects current location information and matches the current location information with pre-stored location information, and sends a registration request requiring for allocation of frequency point information to the home base station manager when the match fails, and the registration request includes the current location information; the home base station manager selects a frequency point for the home base station according to the current location information, and sends the frequency point information to the home base station. The method and system not only enable the home base station manager to flexibly allocate frequency point information for home base station according to different environments, but also accelerate the speed of allocating frequency point information for home base station.

8 Claims, 4 Drawing Sheets

METHOD AND SYSTEM FOR ALLOCATING HOME BASE STATION FREQUENCY POINT AND HOME BASE STATION MANAGER

CROSS REFERENCE RELATED APPLICATIONS

This application is a national phase of PCT/CN2011/071615 filed Mar. 8, 2011, which claims priority to China Application Serial No. 201010183961.2, filed May 15, 2010, both of which are entirely incorporated herein by reference.

TECHNICAL FIELD

The present invention relates to the technology for allocating a frequency point of a home base station, and in particular, to a method and system for allocating a frequency point of a home base station.

Background of the Related Art

A home base station is similar to the Wireless Fidelity (Wi-Fi), is a miniature cellular base station, can connect a home broadband network through the Ethernet, and is mainly used in indoor places such as home and office, etc. The home base station is called differently in different standard organizations. For example, in the Third Generation Partnership Project (3GPP) standard organization, it is called as the Home Node B (HNB) or the Home Evolved Node B (HeNB); while in other standard organizations, such as the Third Generation Partnership Project 2 (3GPP2), etc., it is called as Femto. Although the home base station is called differently, all these home base stations are actually miniature and lower powered cellular base stations.

The ideal home base station should have a plug and play function, that is, the user, after obtaining home base station from the operator, can finish IP connection and IP assignment automatically, and remotely perform the automatic upgrade of the software and the automatic network planning so long as connecting power and network. However, since the frequency point is a very valuable resource in the wireless network, and the available frequency points of a same operator may be different in different areas as well, in order to ensure the home base station of the user is able to really realize the mobility of the plug and play, a fixed mode is adopted to perform the allocation of the frequency point to the home base station at present, that is, the operator buys the dedicated frequency point used for the home base station, or the home base station and the macro cell adopt the same frequency point.

Although the fixed mode can realize the plug and play, it has limited the application range of the home base station as well, which makes the home base station unable to flexibly use the frequency point according to different environments.

SUMMARY OF THE INVENTION

The main objective of the present invention is to provide a method and system for allocating a home base station frequency point, and a home base station manager, which are aimed at flexibly allocating the frequency point information for the home base station according to different environments, and realize the real plug and play of the home base station.

A method for allocating a home base station frequency point provided by the present invention comprises:
a home base station manager receiving current location information sent by a home base station;
selecting a frequency point for the home base station according to the current location information, and sending frequency point information to the home base station.

Preferably, the above-mentioned step of selecting a frequency point for the home base station according to the current location information, and sending frequency point information to the home base station comprises:
the home base station manager judging whether there is a dedicated frequency point reserved to the home base station by an operator in a current location according to the current location information; when there is a dedicated frequency point reserved to the home base station by the operator, then sending information of the dedicated frequency point reserved to the home base station by the operator to the home base station;
when there is no dedicated frequency point reserved to the home base station by the operator, judging whether there is a frequency point, which is available for the home base station and is not coincident with a current frequency point used by a neighbor cell, existing in the neighbor cell; when it exists, sending information of the frequency point which is available for the home base station and is not coincident with the current frequency point used by the neighbor cell to the home base station; otherwise sending information about a free frequency point to the home base station.

Preferably, before the home base station manager receiving the current location information sent by the home base station, further comprising:
the home base station detecting the current location information;
matching the current location information with pre-stored location information;
sending a registration request without requiring for allocation of frequency point information to the home base station manager when match succeeds; or
sending a registration request requiring for allocation of frequency point information to the home base station manager when the match fails, wherein, the registration request comprises the current location information.

The present invention provides a home base station manager, comprising:
a receiving and sending module, configured to receive current location information sent by a home base station; and
a frequency point selecting module, configured to select a frequency point for the home base station according to the current location information, and send frequency point information to the home base station through the receiving and sending module.

Preferably, the above-mentioned frequency point selecting module comprises:
a commercial frequency point selecting unit, configured to judge whether there is a dedicated frequency point reserved to the home base station by an operator in a current location according to the current location information; and when there is a dedicated frequency point reserved to the home base station by the operator, then send information of the dedicated frequency point reserved to the home base station by the operator to the home base station through the receiving and sending module;
a neighbor cell frequency point selecting unit, configured to, when there is no dedicated frequency point reserved to the home base station by the operator, judge whether there is a frequency point, which is available for the home base station and is not coincident with a current frequency point used by a neighbor cell, existing in the neighbor cell; and when it exists, send information of the frequency point which is available for the home base station and is not coincident with the current frequency point used by the neighbor cell to the home base station through the receiving and sending module; and a free frequency point selecting unit, configured to send information about a free frequency point to the home base station through the receiving and sending module when there is no frequency point which is available for the home base station and is not coincident with a current frequency point used by the neighbor cell in the neighbor cell. The present invention further provides a home station, comprising:

a detection module, configured to detect current location information;

a matching module, configured to match the current location information with pre-stored location information; and a sending module, configured to send a registration request without requiring for allocation of frequency point information to the home base station manager when match succeeds; and send a registration request requiring for allocation of frequency point information to the home base station manager when the match fails, wherein, the registration request comprises the current location information.

The present invention further provides a system for allocating a home base station frequency point, comprising:

a home base station, configured to send current location information; and a home base station manager, configured to select a frequency point for the home base station according to the current location information, and send frequency point information to the home base station.

Preferably, the above-mentioned base station comprises:

a detection module, configured to detect the current location information;

a matching module, configured to match the current location information with pre-stored location information; and a sending module, configured to send a registration request without requiring for allocation of frequency point information to the home base station manager when match succeeds; and send a registration request requiring for allocation of frequency point information to the home base station manager when the match fails, wherein, the registration request comprises the current location information.

Preferably, the above-mentioned base station manager comprises:

a receiving and sending module, configured to receive the current location information sent by the home base station; and a frequency point selecting module, configured to select a frequency point for the home base station according to the current location information, and send frequency point information to the home base station through the receiving and sending module.

Preferably, the above-mentioned frequency point selecting module comprises:

a commercial frequency point selecting unit, configured to judge whether there is a dedicated frequency point reserved to the home base station by an operator in a current location according to the current location information; and when there is a dedicated frequency point reserved to the home base station by the operator, send information of the dedicated frequency point reserved to the home base station by the operator to the home base station through the receiving and sending module;

a neighbor cell frequency point selecting unit, configured to, when there is no dedicated frequency point reserved to the home base station by the operator, judge whether there is a frequency point, which is available for the home base station and is not coincident with a current frequency point used by a neighbor cell, existing in the neighbor cell; and when it exists, send information of the frequency point which is available for the home base station and is not coincident with the current frequency point used by the neighbor cell to the home base station; and a free frequency point selecting unit, configured to send information about a free frequency point to the home base station through the receiving and sending module when there is no frequency point which is available for the home base station and is not coincident with a current frequency point used by the neighbor cell in the neighbor cell.

By the method and system for allocating the home base station and the home base station manager provided by the present invention, according to the current location information of the home base station, the frequency point information is flexibly allocated for the home base station, which not only realizes the plug and play function of the home base station, but also reduces the interference between the home base station cell and the macro cell and the interference among each home base station effectively. Furthermore, the home base station matches the current location information and the pre-stored location information of the home base station, and the frequency point information stored by the home base station itself is used when the match succeeds; when the match fails, then the home base station manager is notified to allocate the frequency point information for the home base station, which not only enables the home base station manager to allocate the frequency point information for the home base station flexibly according to different environments, and realizes the real plug and play of the home base station; but also accelerates the speed of allocating the frequency point information for the home base station.

PREFERRED EMBODIMENTS OF THE PRESENT INVENTION

The realization of the objective, the function characteristic and the advantage of the present invention are further described combining with the embodiment and referring to the accompanying drawings. It should be understood that the embodiment described here is only used to explain the present invention, but not used to limit the present invention.

Figure 1:
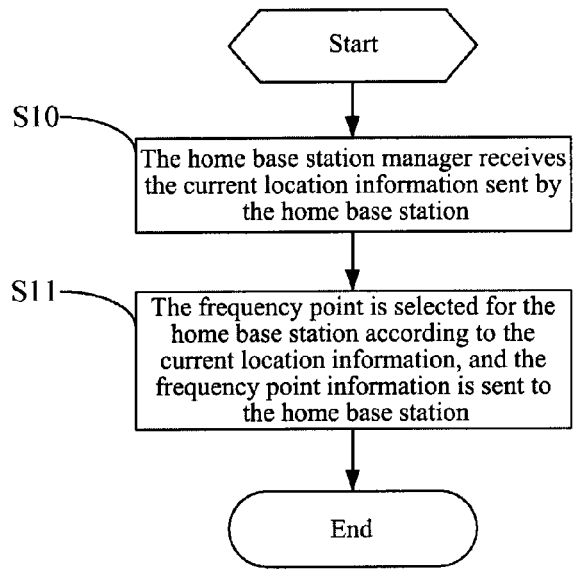
FIG. 1 is a flow chart of a method for allocating a home base station frequency point according to one embodiment of the present invention.

FIG. 1 is a flow chart of a method for allocating a home base station frequency point according to one embodiment of the present invention.

The method for allocating a home base station frequency point of the present embodiment includes the following steps.

In step S10, the home base station manager receives the current location information sent by the home base station.

The current location information is the location information of the location where the home base station detects it is located. In the present embodiment, the current location information is preferably three kinds of information, the global positioning system (GPS) location information, the neighbor cell information and the broadband connection information. It needs to be illustrated here that the present location information can include three kinds, the GPS location information, the neighbor cell information and the broadband connection information, and also can include any one or any two of the GPS location information, the neighbor cell information and the broadband connection information, or other location information.

In step S11, the frequency point is selected for the home base station according to the current location information, and the frequency point information is sent to the home base station.

Figure 2:
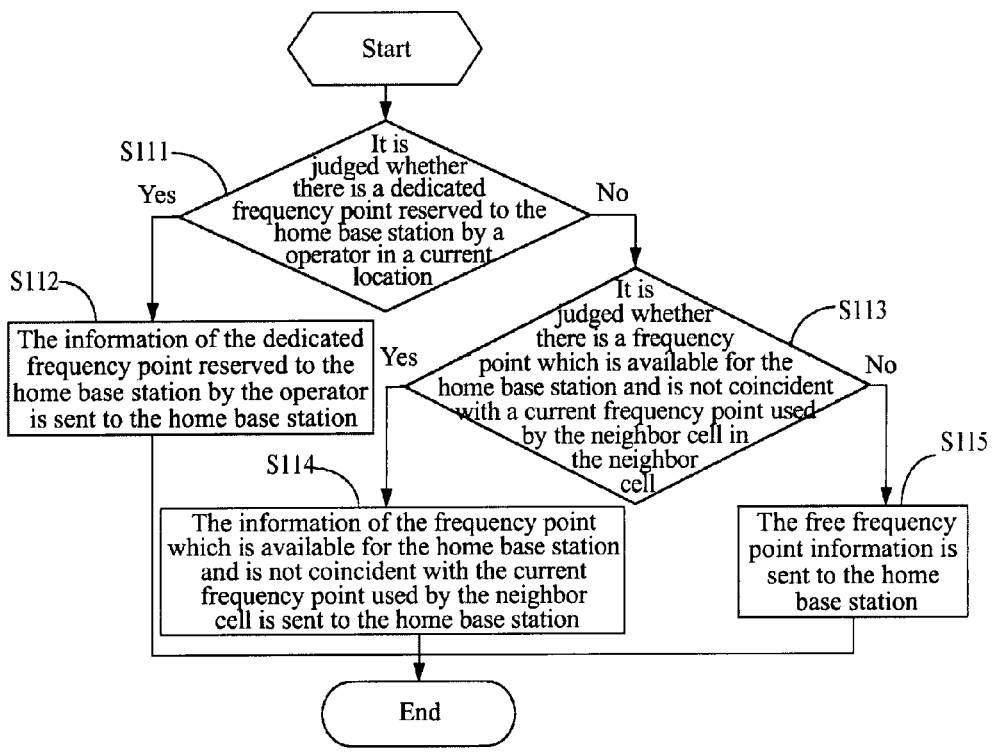
FIG. 2 is a flow chart of step S11 in FIG. 1.

Referring to FIG. 2, the step S11 specifically comprises following steps.

In step S111, it is judged whether there is a dedicated frequency point reserved to the home base station by an operator in a current location; when there is a dedicated frequency point reserved to the home base station by the operator, then step S112 is executed; otherwise, step 113 is executed.

The home base station manager judges whether there is a dedicated frequency point reserved to the home base station by a operator in a current location according to the current location information.

In step S112, the information of the dedicated frequency point reserved to the home base station by the operator is sent to the home base station.

The operator will reserve certain frequency points to support the indoor coverage according to the overall plan of the indoor coverage and the frequency point resource. For example, a certain operator only has the bandwidth of 10 MHz in A cell, which supports 6 frequency points. According to the plan, 1 frequency point can be reserved for indoor, and other 5 frequency points are used for outdoor. According to the current location information detected by the home base station, the frequency point information of that operator is searched, and it is judged whether there is a dedicated frequency point reserved to the home base station by the operator, that is, the payment frequency point. When there is a dedicated frequency point reserved for the home base station by the operator, then the information of the dedicated frequency point reserved to the home base station by the operator is sent to the home base station.

In step S113, it is judged whether there is a frequency point, which is available for the home base station and is not coincident with a current frequency point used by the neighbor cell, existing in the neighbor cell; when there is a frequency point which is available for the home base station and is not coincident with a current frequency point used by the neighbor cell existing in the neighbor cell, then step S114 is executed; otherwise, step S115 is executed.

In step S114, the information of the frequency point which is available for the home base station and is not coincident with the current frequency point used by the neighbor cell is sent to the home base station.

When it is confirmed that there is no dedicated frequency point reserved to the home base station by the operator in the location where the home base station locates, the neighbor cell of the located location is searched, and it is queried in the neighbor cell whether there is a frequency point which is available for the home base station and is not coincident with the current frequency point used by the neighbor cell in the neighbor cell. Through querying for the frequency point which can be supported by the own ability of the home base station and is not coincident with the current frequency point used by the neighbor cell, it can avoid that the same one frequency point is used by each home base station and by the home base station cell and the macro cell.

In step S115, the free frequency point information is sent to the home base station.

When there is no dedicated frequency point reserved to the home base station by the operator in the location where the home base station locates and there is no frequency point which is available for the home base station and is not coincident with the current frequency point used by the neighbor cell in the neighbor cell, then the free frequency point is allocated to the home base station.

In the method for allocating the home base station of the present embodiment, according to the current location information sent by the home base station, the frequency point information is flexibly allocated to the home base station, which not only realizes the plug and play function of the home base station, but also reduces the interference between the home base station cell and the macro cell and the interference among each home base station effectively.

Figure 3:
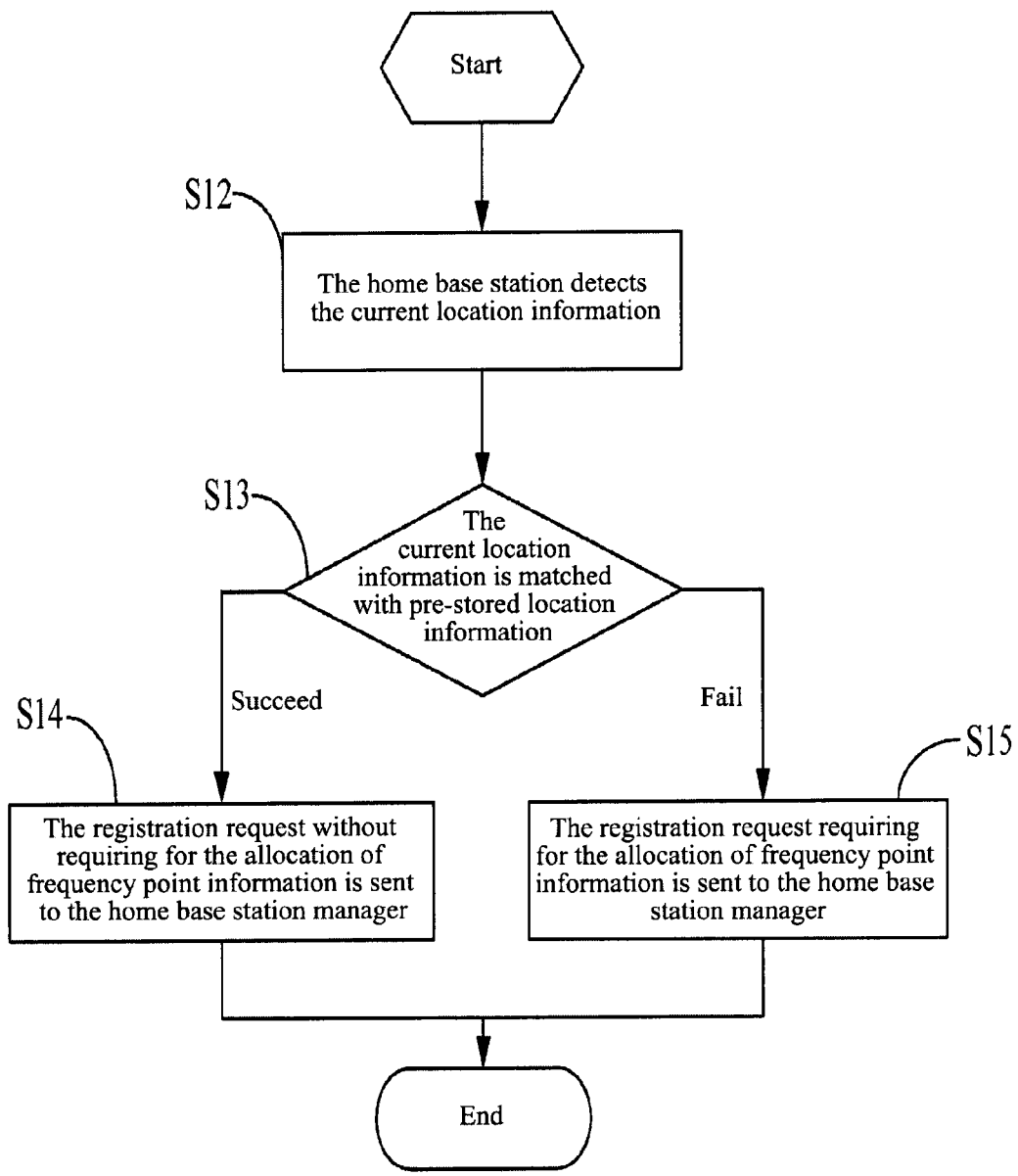
FIG. 3 is a flow chart of a method for allocating a home base station frequency point according to another embodiment of the present invention.

FIG. 3 is a flow chart of a method for allocating a home base station frequency point according to another embodiment of the present invention.

Before the step S10 of the above-mentioned embodiment, the allocation method further includes the following.

In step S12, the home base station detects the current location information.

The current location information is the location information of the location where the home base station detects it is located. In the present embodiment, the current location information includes preferably three kinds of information, the GPS location information, the neighbor cell information and the broadband connection information.

in step S13, the current location information is matched with pre-stored location information; if the match succeeds, then step S14 is executed; if the match fails, then step S15 is executed.

When the home base station is used in location A, then the frequency point information allocated for the home base station by the home base station manager and the location information of the location A will be regarded as the pre-stored location information and stored in the home base station. When the home base station has been used in location B, then the frequency point information allocated for the home base station by the home base station manager and the location information of the location B will also be regarded as the pre-stored frequency point information and stored in the home base station. So, the pre-stored location information includes all location information already used by the home base station and the corresponding frequency point information. Through matching the current location information with the pre-stored location information, it can be judged whether the home base station is already used in the current location. If the base station is already used in the current location, then the frequency point information matched with the current location information is used; if the home base station is not used in the current location, then the current location information is sent to the home base station manager, so that the home base station manager allocates new frequency point information for the base station.

In step S14, a registration request without requiring for the allocation of frequency point information is sent to the home base station manager.

When the current location information is matched with the pre-stored location information, the home base station sends the registration request without requiring for the allocation of frequency point information to the home base station manager. The home base station manager allocates other allocation information except the frequency point information for the home base station according to that registration request. The other allocation information includes the transmission power of the home base station and the number of the users allowed to access, etc.

In step S15, a registration request requiring for the allocation of frequency point information is sent to the home base station manager.

When the current location information is not matched with the pre-stored location information, the home base station sends the registration request requiring for the allocation of frequency point information to the home base station manager. That registration request includes the current location information. The home base station manager allocates the frequency point information and other allocation information except the frequency point information for the home base station according to that registration request.

The method for allocating the home base station frequency point of the present embodiment matches the current location information and the pre-stored location information of the home base station, and the frequency point information stored by the home base station itself is used when the match succeeds; when the match fails, then the home base station manager is notified to allocate the frequency point information for it, which not only enables the home base station manager to allocate the frequency point information for the home base station flexibly according to different environments, and realizes the real plug and play of the home base station; but also accelerates the speed of allocating the frequency point information for the home base station.

The procedure for allocating the home base station frequency point is illustrated by examples respectively hereinafter. It needs to be illustrated that the home base stations described below are all the home base stations applied in the long term evolution (LTE), which can use the global free frequency points and all the frequency points which can be used by LTE systems; the home base station includes a wireless measurement module and a GPS module, and the home base station connects the communication network through the digital subscriber line (DSL) or the passive optical network (PON); the home base station has already passed the safety authentication of the home base station manager.

(1). The home base station 1 is used in the current location for the first time, and the home base station 1 connects the communication network through the DSL.

A, the home base station 1 detects the current location information, and the result is as follows.

The home base station 1 cannot search out the satellite, and cannot provide the longitude and latitude of the current location, but it is detected that there is information about 3 cells in the current location, and the information is respectively:

|  | Universal mobile communication system cell | LTE cell | Global wireless communication system cell |
|---|---|---|---|
| Frequency point of downlink carrier frequency | 2.1 GHz | 2.6 GHz | 900 MHz |
| Intensity of received signal | −75 dBm | −89 dBm | −80 dBm |
| Cell ID | 7 | 8 | 9 |

Also, it is detected that the port number of the current DSL is 123456.

B, the home base station 1 matches the current location information with the pre-stored location information.

Here, the current location information is the port number of the DSL and the cell ID, and the port number of the DSL 123456 and the cell ID are matched with the pre-stored location information. It needs to be illustrated that when the home base station can detect the above-mentioned three kinds of location information at the same time, then the detected three kinds of location information are matched with the pre-stored location information respectively, and the match succeeds so long as there is one kind of the location information which agrees with the pre-stored location information.

C, the match of the current location information and the pre-stored location information fails, then the home base station 1 will send the registration request requiring for the allocation of frequency point information to the home base station manager; if the result of the match fails, it illustrates that the home base station 1 is used for the first time at the current location, and then there is no frequency point information matched with the current location information.

D, the home base station manager allocates the frequency point information and other allocation information except the frequency point information for the home base station 1 according to the registration request.

(2). The home base station 2 is already used at the current location, and the home base station connects the communication network through the PON.

A, the home base station 2 detects the current location information, and the result is as follows.

The home base stations 2 finds the satellite, and provides the longitude and latitude information of the current location which are 901 and 765 respectively; and also detects that there is information about 3 cells in current location, and the information is respectively:

|  | Universal mobile communication system cell | LTE cell | Global wireless communication system cell |
|---|---|---|---|
| Frequency point of downlink carrier frequency | 2.1 GHz | 2.6 GHz | 900 MHz |
| Intensity of received signal | −75 dBm | −89 dBm | −80 dBm |
| Cell ID | 7 | 8 | 9 |

Also, it is detected that the port number of the current PON is 987654.

B, the home base station 2 matches the current location information with the pre-stored location information.

Here, the current location information is the longitude and latitude information, the port number of the PON and the cell ID, the longitude and latitude information (901 and 765), the port number 123456 of the PON and the cell ID are matched with the pre-stored location information.

C, the match of the current location information and the pre-stored location information succeeds, then the home base station 2 sends the registration request without requiring for the allocation of frequency point information to the home base station manager; if the result of the match succeeds, it illustrates that the home base station 2 is already used at the current location, and the corresponding frequency point is 2.65 GHz.

D, the home base station manager allocates other allocation information except the frequency point information for the home base station 2 according to the registration request.

Before the above-mentioned step S12, it further includes that: the home base station manager performs the safety authentication on the home base station.

The safety authentication is performed on the home base station through the home base station manager, which guarantees the safety of the home base station accessing the core network.

The safety authentication mainly includes the following three kinds:

(1), the device authentication, specifically, after the home base station powers up, the device authentication is performed on the home base station at first, which confirms the identity of the home base station and the legitimacy of the hardware device;

(2), the admission authentication, specifically, when the user equipment (UE) requests to access the network through the home base station, the home base station interacts with the safety gateway and the core network device respectively, and the UE admission authentication is performed to judge whether the UE has the power to access the home base station;

(3), the UE authentication, specifically, the access request of the UE attached to the home base station will be forwarded to the mobile core network, and the UE access authentication is performed in the traditional mobile network continuously.

Figure 4:
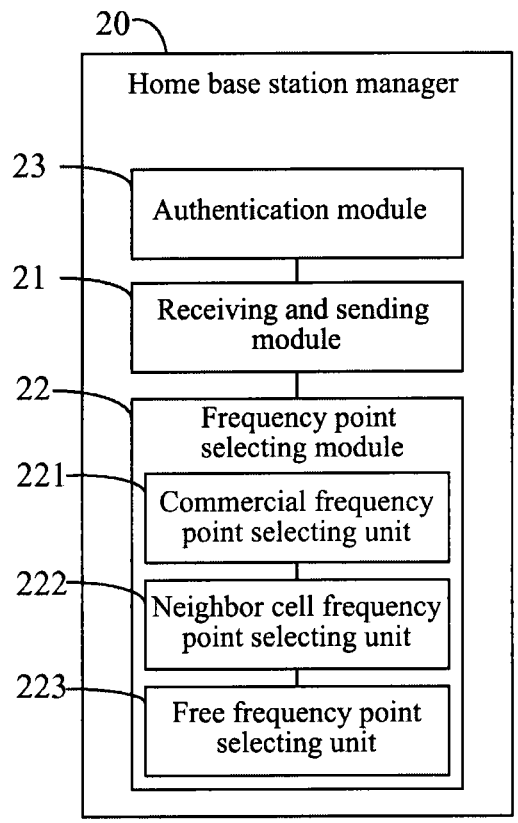
FIG. 4 is a structure diagram of a home base station manager according to one embodiment of the present invention.

FIG. 4 is a structure diagram of a home base station manager according to one embodiment of the present invention.

The home base station manager 20 of the present embodiment includes:

a receiving and sending module 21, configured to receive current location information sent by a home base station; and a frequency point selecting module 22, configured to select a frequency point for the home base station according to the current location information, and send frequency point information to the home base station through the receiving and sending module 21.

The above-mentioned frequency point selecting module 22 includes:

a commercial frequency point selecting unit 221, configured to judge whether there is a dedicated frequency point reserved to the home base station by an operator in a current location according to the current location information; and when there is a dedicated frequency point reserved to the home base station by the operator, then send information of the dedicated frequency point reserved to the home base station by the operator to the home base station through the receiving and sending module 21;

a neighbor cell frequency point selecting unit 222, configured to, when there is no dedicated frequency point reserved to the home base station by the operator, judge whether there is a frequency point, which is available for the home base station and is not coincident with a current frequency point used by a neighbor cell, existing in the neighbor cell; and when it exists, send information of the frequency point which is available for the home base station and is not coincident with the current frequency point used by the neighbor cell to the home base station through the receiving and sending module 21; and a free frequency point selecting unit 223, configured to send information about a free frequency point to the home base station through the receiving and sending module 21 when there is no frequency point which is available for the home base station and is not coincident with a current frequency point used by the neighbor cell in the neighbor cell.

The above-mentioned home base station manager 21 further includes:

an authentication module 23, configured to perform safety authentication on the home base station.

The home base station manager of the present embodiment, according to the current location information sent by the home base station, flexibly allocates the frequency point information for the home base station, which not only enables the home base station to realize the plug and play function, but also reduces the interference between the home base station cell and the macro cell and among each home base station.

Figure 5:
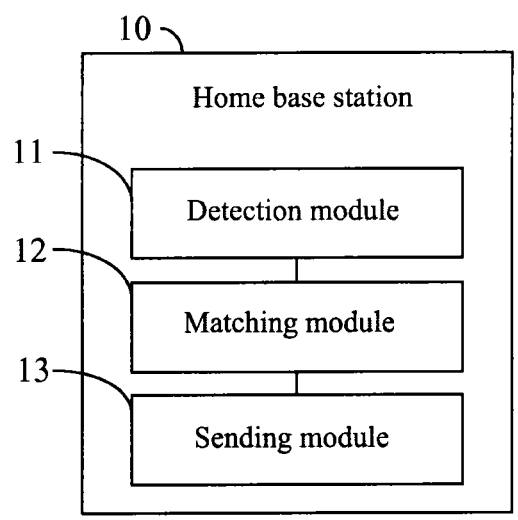
FIG. 5 is a structure diagram of a home base station according to one embodiment of the present invention.

FIG. 5 is a structure diagram of a home base station according to one embodiment of the present invention.

The home station 10 of the present embodiment includes:

a detection module 11, configured to detect the current location information;

a matching module 12, configured to match the current location information with pre-stored location information; and a sending module 13, configured to send a registration request without requiring to allocate frequency point information to the home base station manager when match succeeds; and send a registration request requiring to allocate frequency point information to the home base station manager when the match fails, wherein, the registration request includes the current location information.

The home base station of the present embodiment can match the pre-stored location information stored by itself with the current location information, if the match succeeds, then there is no need for the home base station managers to allocate the frequency point information for it, which accelerates the speed of allocating the home base station frequency point.

Figure 6:
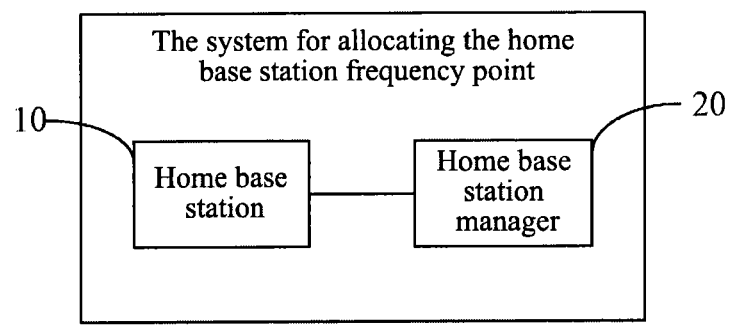
FIG. 6 is a structure diagram of a system for allocating a home base station frequency point according to one embodiment of the present invention.

FIG. 6 is a structure diagram of system for allocating a home base station frequency point according to one embodiment of the present invention.

The system for allocating a home base station frequency point of the present embodiment includes:

a home base station 10, configured to send current location information; and a home base station manager 20, configured to select a frequency point for the home base station 10 according to the current location information, and send frequency point information to the home base station 10.

Referring to FIG. 5, the above-mentioned base station 10 includes:

a detection module 11, configured to detect the current location information;

a matching module 12, configured to match the current location information with pre-stored location information; and a sending module 13, configured to send a registration request without requiring to allocate frequency point information to the home base station manager 20 when match succeeds; and send a registration request requiring to allocate frequency point information to the home base station manager 20 when the match fails, wherein, the registration request comprises the current location information.

Referring to FIG. 4, the base station manager 20 includes:

a receiving and sending module 21, configured to receive the current location information sent by the home base station 10; and a frequency point selecting module 22, configured to select a frequency point for the home base station 10 according to the current location information, and send frequency point information to the home base station 10 through the receiving and sending module 21;

an authentication module 23, configured to perform safety authentication on the home base station 10.

The above-mentioned frequency point selecting module 22 includes:

a commercial frequency point selecting unit 221, configured to judge whether there is a dedicated frequency point reserved to the home base station 10 by an operator in a current location according to the current location information; and when it exists, then send information of the dedicated frequency point reserved to the home base station 10 by the operator to the home base station 10 through the receiving and sending module 21;

a neighbor cell frequency point selecting unit 222, configured to, when there is no dedicated frequency point reserved to the home base station 10 by the operator, judge whether there is a frequency point which is available for the home base station 10 and is not coincident with a current frequency point used by a neighbor cell in the neighbor cell; and when it exists, send information of the frequency point which is available for the home base station 10 and is not coincident with the current frequency point used by the neighbor cell to the home base station 10 through the receiving and sending module 21; and a free frequency point selecting unit 223, configured to send free frequency point information to the home base station 10 through the receiving and sending module 21 when there is no frequency point which is available for the home base station and is not coincident with a current frequency point used by the neighbor cell in the neighbor cell.

In the system for allocating the home base station frequency point of the present embodiment, the home base station 10 matches the current location information with the pre-stored location information of the home base station 10, and the frequency point information stored by the home base station 10 itself is used when the match succeeds; when the match fails, then the home base station manager 20 is notified to allocate the frequency point information for the home base station, which not only enables the home base station manager 20 to allocate the frequency point information for the home base station 10 flexibly according to different environments, and realizes the real plug and play function of the home base station 10; but also accelerates the speed of allocating the frequency point information for the home base station 10.

The above description is only the preferable embodiments of the present invention and is not intended to limit the patent scope of the present invention. All conversions of equivalents structures and equivalents procedures made by using the description and accompanying drawings of the present invention, or direct or indirect using in other related technical field, should be embodied in the scope of the appending claims of the present invention.

What we claim is:

1. A method for allocating a home base station frequency point, comprising:
    a home base station manger receiving current location information sent by a home base station;
    selecting a frequency point for the home base station according to the current location information, and sending frequency point information to the home base station;
    wherein, the step of selecting a frequency point for the home base station according to the current location information, and sending frequency point information to the home base station comprises;
    the home base station manager judging whether there is a dedicated frequency point reserved to the home base station by an operator in a current location according to the current location information; when there is a dedicated frequency point reserved to the home base station by the operator, then sending information of the dedicated frequency point reserved to the home base station by the operator to the home base station;
    when there is no dedicated frequency point reserved to the home base station by the operator, judging whether there is a frequency point, which is available for the home base station and is not coincident with a current frequency point used by a neighbor cell, existing in the neighbor cell; when it exists, sending information of the frequency point which is available for the home base station and is not coincident with the current frequency point used by the neighbor cell to the home base station; otherwise sending information about a free frequency point to the home base station.

2. The method according to claim 1, before the home base station manager receiving the current location information sent by the home base station, further comprising:
    the home base station detecting the current location information;
    matching the current location information with pre-stored location information;
    sending a registration request without requiring for allocation of frequency point information to the home base station manager when match succeeds; or
    sending a registration request requiring for allocation of frequency point information to the home base station manager when the match fails, wherein, the registration request comprises the current location information.

3. The method according to claim 1, before the home base station manager receiving the current location information sent by the home base station, further comprising:
    the home base station detecting the current location information;
    matching the current location information with prestored location information;
    sending a registration request without requiring for allocation of frequency point information to the home base station manager when match succeeds; or
    sending a registration request requiring for allocation of frequency point information to the home base station manager when the match fails, wherein, the registration request comprises the current location information.

4. A home base station manager, comprising:
    a receiving and sending module, configured to receive current location information sent by a home base station; and
    a frequency point selecting module, configured to select a frequency point for the home base station according to the current location information, and send frequency point information to the home base station through the receiving and sending module;
    wherein, the frequency point selecting module comprises:
    a commercial frequency point selecting unit, configured to judge whether there is a dedicated frequency point reserved to the home base station by an operator in a current location according to the current location information; and when there is a dedicated frequency point reserved to the home base station by the operator, then send information of the dedicated frequency point reserved to the home base station by the operator to the home base station through the receiving and sending module;
    a neighbor cell frequency point selecting unit, configured to, when there is no dedicated frequency point reserved to the home base station by the operator, judge whether there is a frequency point, which is available for the home base station and is not coincident with a current frequency used by a neighbor cell, existing in the neighbor cell; and when it exist, send information of the frequency point which is available for the home base station and is not coincident with the current frequency point used by the neighbor cell to the home base station through the receiving and sending module; and a free frequency point selecting unit, configured to send information about a free frequency point to the home base station through the receiving and sending module when there is no frequency point which is available for the home base station and is not coincident with a current frequency point used by the neighbor cell in the neighbor cell.

5. A home station, comprising:

a detection module, configured to detect current location information;

a matching module, configured to match the current location information with pre-stored location information; and a sending module, configured to send a registration request without requiring for allocation of frequency point information to the home base station manager and use the frequency point information stored by the home station, when match succeeds; and send a registration request requiring for allocation of frequency point information to the home base station manager when the match fails, wherein, the registration request comprises the current location information.

6. A system for allocating a home base station frequency point, comprising:

a home base station, configured to send current location information; and a home base station manager, configured to select a frequency point for the home base station according to the current location information, and send frequency point information to the home base station;

wherein, the base station comprises:

a detection module, configured to detect the current location information;

a matching module, configured to match the current location information with pre-stored location information; and a sending module, configured to send a registration request without requiring for allocation of frequency point information to the home base station manager and use frequency point information stored by the home station when match succeeds; and send a registration request requiring for allocation of frequency point information to the home base station manager when the match fails, wherein, the registration request comprises the current location information.

7. The system according to claim 6, wherein, the base station manager comprises:

a receiving and sending module, configured to receive the current location information sent by the home base station; and a frequency point selecting module, configured to select a frequency point for the home base station according to the current location information, and send frequency point information to the home base station through the receiving and sending module.

8. The system according to claim 7, wherein, the frequency point selecting module comprises:

a commercial frequency point selecting unit, configured to judge whether there is a dedicated frequency point reserved to the home base station by an operator in a current location according to the current location information; and when there is a dedicated frequency point reserved to the home base station by the operator, send information of the dedicated frequency point reserved to the home base station by the operator to the home base station through the receiving and sending module;

a neighbor cell frequency point selecting unit, configured to, when there is no dedicated frequency point reserved to the home base station by the operator, judge whether there is a frequency point, which is available for the home base station and is not coincident with a current frequency point used by a neighbor cell, existing in the neighbor cell; and when it exists send information of the frequency point which is available for the home base station and is not coincident with the current frequency point used by the neighbor cell to the home base station; and a free frequency point selecting unit, configured to send information about a free frequency point to the home base station through the receiving and sending module when there is no frequency point which is available for the home base station and is not coincident with a current frequency point used by the neighbor cell in the neighbor cell.

* * * * *